United States Patent
Martti et al.

(10) Patent No.: US 8,131,256 B2
(45) Date of Patent: Mar. 6, 2012

(54) GENERATING AND PROVIDING ACCESS AND CONTENT CHARGES FOR DIFFERENT SERVICES TO A USER DEVICE IN A COMMUNICATION SYSTEM

(75) Inventors: Jyrki Martti, Espoo (FI); Sami Mäkeläinen, Helsinki (FI)

(73) Assignee: Nokia Corporation, Espoo (FI)

( * ) Notice: Subject to any disclaimer, the term of this patent is extended or adjusted under 35 U.S.C. 154(b) by 521 days.

(21) Appl. No.: 11/300,297

(22) Filed: Dec. 15, 2005

(65) Prior Publication Data

US 2006/0253294 A1      Nov. 9, 2006

(30) Foreign Application Priority Data

May 9, 2005   (GB) ................... 0509440.4

(51) Int. Cl.
*H04M 11/00* (2006.01)
*H04M 15/00* (2006.01)
*H04M 15/16* (2006.01)

(52) U.S. Cl. ............ 455/406; 455/408; 379/114.01; 379/114.05

(58) Field of Classification Search ........... 705/1; 455/406–408
See application file for complete search history.

(56) References Cited

U.S. PATENT DOCUMENTS

| | | | |
|---|---|---|---|
| 5,737,414 A | 4/1998 | Walker et al. | |
| 6,240,091 B1 | 5/2001 | Ginzboorg et al. | |
| 6,865,262 B1 | 3/2005 | Mitts et al. | |
| 2001/0001147 A1* | 5/2001 | Hutchison et al. | 705/26 |
| 2002/0002470 A1* | 1/2002 | Arai | 705/1 |
| 2002/0128966 A1* | 9/2002 | Simonen | 705/400 |
| 2002/0194143 A1 | 12/2002 | Banerjee et al. | |
| 2003/0083990 A1 | 5/2003 | Berg et al. | |
| 2003/0229595 A1* | 12/2003 | Mononen et al. | 705/63 |
| 2004/0039656 A1 | 2/2004 | Gerber et al. | |
| 2004/0203580 A1* | 10/2004 | Engelhart | 455/406 |
| 2006/0242038 A1* | 10/2006 | Giudilli | 705/35 |
| 2007/0027775 A1* | 2/2007 | Hwang | 705/26 |
| 2008/0160957 A1* | 7/2008 | Ono | 455/408 |

FOREIGN PATENT DOCUMENTS

| | | |
|---|---|---|
| JP | 2002-026895 | 1/2002 |
| JP | 2003 173398 | 6/2003 |
| JP | 2004 133801 | 4/2004 |
| KR | 20050006514 A | 1/2005 |
| WO | WO 01/91445 A1 | 11/2001 |
| WO | WO 03102730 A2 * | 12/2003 |

OTHER PUBLICATIONS

Harri Hakala et al., "Diameter Credit-Control Application", Nokia, Aug. 12, 2004; AAA Working Group, Internet Draft, Document: draft-ietf-aaa-diameter-cc-06.txt, Expires Feb. 12, 2005.

* cited by examiner

*Primary Examiner* — Nick Corsaro
*Assistant Examiner* — Tangela T. Chambers
(74) *Attorney, Agent, or Firm* — Harrington & Smith

(57) ABSTRACT

A user device (20) is provided with information relating to a service wherein content is communicated to the user device via an access system provided by a communications network (22). In the method information regarding access charges from a charging entity (26) associated with the access system is provided to a service provider entity (24), where after an indication of total cost of the service covering content charges and the access charges is sent from the service provider entity to the user device. Alternatively, indication of the total costs can be sent directly to the user device from the charging entity.

33 Claims, 6 Drawing Sheets

GENERATING AND PROVIDING ACCESS AND CONTENT CHARGES FOR DIFFERENT SERVICES TO A USER DEVICE IN A COMMUNICATION SYSTEM

FIELD OF THE INVENTION

The present invention relates to services offered to end-users of a communication system, and more particularly, to services wherein content is delivered to user devices of the end-users.

BACKGROUND OF THE INVENTION

A communication system is a facility which enables communication between two or more entities such as user terminal equipment (mobile or fixed) or other communication devices and/or network entities and other nodes associated with a communication system. The communication may comprise, for example, communication of voice, electronic mail (email), text messages, data, multimedia and so on. A communications system may also be used for providing users with services, typically for communication between users and service providers and for delivery of content data to the user devices. The content data delivery typically includes downloading of data from a remote node, such as a service provide server, via an access system of the communications system.

A communication system typically operates in accordance with a given standard or with a given set of specifications which set out what the various elements of a system are permitted to do and how that should be achieved. For example, the standard or specification may define if the user, or more precisely user equipment, is provided with access via a circuit switched bearer or a packet switched bearer, or both. Communication protocols and/or parameters which should be used for the access to the communication system are also typically defined. For example, the manner in which communication should be implemented between the user equipment and the elements of the communication networks is typically based on a predefined communication protocol. In other words, a specific set of "rules" on which the communication can be based needs to be defined to enable the user equipment to communicate via the communication system.

Access for a user device to the communication system may be provided by a fixed line and/or wireless communication interface. An example of communication systems providing wireless access are public land mobile networks (PLMN). In a more detailed example the end-user may access the service via a GPRS (General Packet Radio Service) or another cellular wireless access system operated by a telephone operator. Other examples pf possible wireless access systems include various wireless local area networks (WLANs) and satellite based systems. Examples of communication systems providing fixed line access include public switched telephone networks (PSTN), cable networks, digital subscriber line (DSL) networks, and so on.

Content services can be provided by third party service providers (TPSP). The end-users can be subscribers of an operator, for example a fixed line operator or a mobile operator (MO), and commonly use an access network of a telecommunications system operator to contact the third party service provider's service portal. When a third party service provider (TPSP) provides a service to an end-user, it may need to indicate the price of the service to the end-user. The total cost of the service may need to be presented, for example, for customer service reasons. In some countries the cost may need to be indicated for legal reasons.

The third party service provider typically knows the price of the content which it delivers. However, if for example a downloadable game or other considerable data volume is delivered, the end-user may also need to pay for the access costs. The problem is that the third party service provider does not necessarily know what will the access charges be. For example, the third party service provider may not be aware of the access charges for a particular content download.

Arrangements wherein a charging interface is provided between a third party service provider (TPSP) and a mobile operator (MO) have been proposed. In a scenario a TPSP may use a charging interface to request charging information from the mobile operator whose subscriber the end-user is. However, the charging interface has not been designed for provision of information to the end-user relating to the total cost of a particular content download and it's delivery, for example via a GPRS access system. Instead, the cost that has typically been indicated to the end-user is the price of the content itself with a vague reference to additional access charges that may apply. This may not enable the end-user to get any realistic indication of the likely total costs, unless he or she is able to convert the volume of the content to be downloaded to the access charge costs applicable at that specific time. This may not satisfy legislative requirement of some countries where it might be required that the end-user must be given a substantially accurate indication of the total cost of the service.

SUMMARY OF THE INVENTION

In accordance with an embodiment there is provided a method for providing a user device with information relating to a service wherein content associated with a service provided by a service provider is communicated to the user device via an access system provided by a communications network. In the method information regarding access charges of the access system is generated. Said information regarding access charges of the access system is then communicated together with content charges of the service provider to the user device.

Another embodiment provides a charging server comprising means for generating information regarding access charges of an access system of a communication network when content that is associated with a service provided by a service provider is communicated to a user device via the access system, and an interface for sending said information regarding access charges of the access system for communication together with content charges of the service provider to the user device.

Another embodiment provides a service provider entity, comprising an interface for receiving information from a charging entity associated with an access system of a communication network relating to costs of the access system for communication of content that is associated with a service provided by the service provider entity to a user device via the access system, and means for sending information regarding access charges of the access system for communication together with content charges of the service provider to the user device.

The embodiments of the invention may provide an advantage in that making it easier for the end-users to make decisions on whether to buy a service or not. The embodiments may enable providing the user with an indication of the total service costs. Such an indication may make the available services more attractive for end-users. Charging services offered by the operators may also become more attractive for third party service providers.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

To assist in understanding the invention, an explanation of a possible underlying communication system is given first with reference to elements of a cellular mobile communication network as defined by the third generation partnership project (3GPP). It is noted that although certain embodiments will now be described by way of example, with reference to the exemplifying architectures of a communication system comprising 3GPP mobile access networks and/or wireless local area networks, embodiments may be applied to any other suitable forms of communication systems than those illustrated and described herein.

Figure 1:
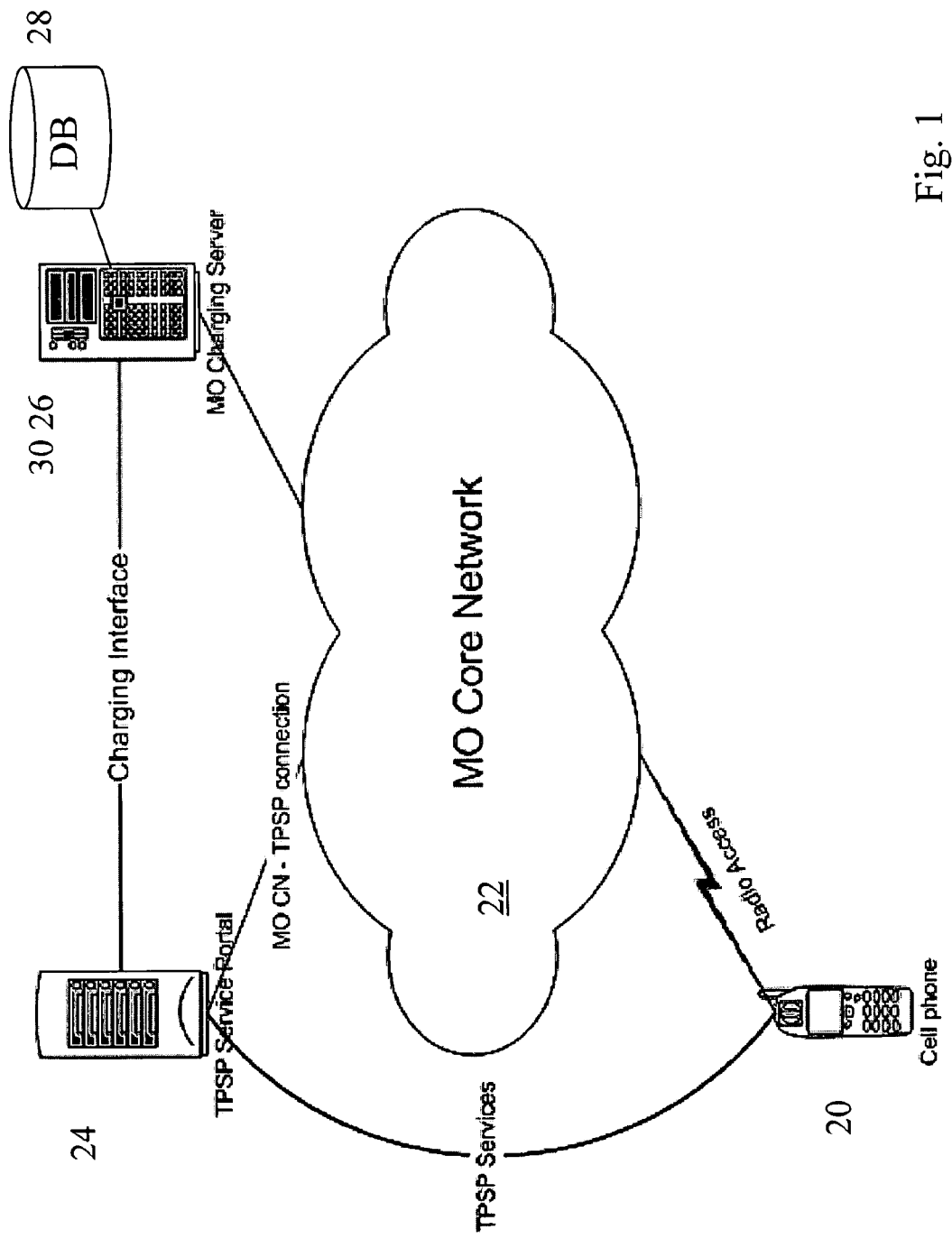
FIG. 1 shows a schematic view of a communications system wherein the invention may be embodied.

A user device of an end-user may communicate data in association with various services based on an appropriate data communication protocol. In FIG. 1 the services available for mobile user devices 20 (only one shown for clarity) are provided by a service provider portal 24. The portal may be provided by a server or any other appropriate data processing device capable of communicating with user devices. The services may be provided, for example, by means of the Internet Protocol (IP), and thus the portal 24 can be understood as, for example, denoting an Internet Protocol (IP) based device.

A mobile communication system 22 is typically arranged to serve a plurality of mobile user devices which have accessed wirelessly the access system. A core network part of the communication system is typically connected to a number of access networks, typically to base station systems. The base stations are arranged to transmit signals to and receive signals from a mobile user equipment, via respective wireless interfaces. Correspondingly, each mobile device is able to transmit signals to and receive signals from the base stations via the wireless interface. In a typical operation a mobile communication network provides packet switched data transmission in the packet switched domain between a support node and mobile user equipment via the access system.

A non-limiting example of a possible mobile network is the 3rd generation cellular network wherein a mobile user device may connect to an access network by setting up a PDP (Packet Data Protocol) context through a GPRS (General Packet Radio Service) network. The GPRS service allows transmission of packet data between mobile communication devices and external data networks. In this case the mobile network 22 would be connected to external data networks, for example the Internet, via a gateway GPRS support node (GGSN). Each PDP context provides a communication pathway between a particular user and a gateway node of the network. Once the PDP context is established, it can typically carry multiple flows. Each flow normally represents, for example, a particular service and/or media component of a particular service. The PDP context therefore often represents a logical communication pathway for one or more flows across the network. To implement the PDP context between user equipment and a node, radio access bearers need to be established which commonly allow for data transfer for the user equipment. Another option to wirelessly access services is to set up an Internet protocol security (IPsec) tunnel through a WLAN network that is then connected to a core communication network.

A mobile communication device within an access network may communicate with a radio network controller via radio network channels which are typically referred to as radio bearers. Each mobile device such as a mobile user equipment may have one or more radio channels open at any one time with the radio network controller. Any appropriate mobile device adapted for Internet protocol (IP) communication maybe used to connect to the network. For example, a user may access the cellular network by means of communication devices such as a personal computer, personal data assistant (PDA), mobile station (MS), portable computer, combinations thereof or the like.

The mobile communication device can be used for various tasks such as making and receiving phone calls, for receiving and sending data from and to a network and for experiencing, for example, multimedia or other content. The communication device is typically provided with a processor and memory for accomplishing these tasks. The operation of the user equipment may be controlled by means of a suitable user interface such as key pad, voice commands, touch sensitive screen or pad, combinations thereof or the like.

The following describes an exemplifying embodiment for charging of services provided by third party service providers utilizing bearer services offered by a mobile operator. The example is described with reference to FIG. 1 wherein an end-user using a mobile terminal (MT) 20 is a subscriber to a mobile operator (MO) operating network 22. The end-user may request for services provided by a third party service provider (TPSP) portal 24.

Use of the services can be charged by the third party service provider by sending of charging requests to a charging server 26 hosting the end-user charging account. The mobile operator (MO) may be responsible for the operation of the communications network 22 and the charging server 26. The charging server 26 may be based on an existing charging server of an operator. In such case the server and/or system functionality thereof may need to be updated to support the new functionalities required by the embodiment.

An online charging web service interface 30 is provided between the third party service provider portal 24 and charging server 26. The charging interface may be provided by an external data network, for an Internet Protocol based network and/or via the communications network 22. The online charging interface 30 supports communication of indications associated with the costs of services. The third party service provider portal 24 may use the charging interface 30 to charge via operator based billing the end-users for the services the end-users are using. The online charging interface 30 can be used to indicate the charges that are applicable to a service provided to user devices in an access system associated with the charging server. This is an important improvement on the prior art charging interfaces which have not been used for consideration how access charges, in addition to the content price, that relate to delivery of the content can be reported to the TPSP in order to provided the end-user with an indication of the total cost of the content download.

A database 28 is also provided for storing information needed to resolve the access changes for a specific service. The database may be hosted by the mobile operator, or any other appropriate party. The database 28 may be integrated with the server 26, or the server may be provided with an access thereto.

Figure 2:
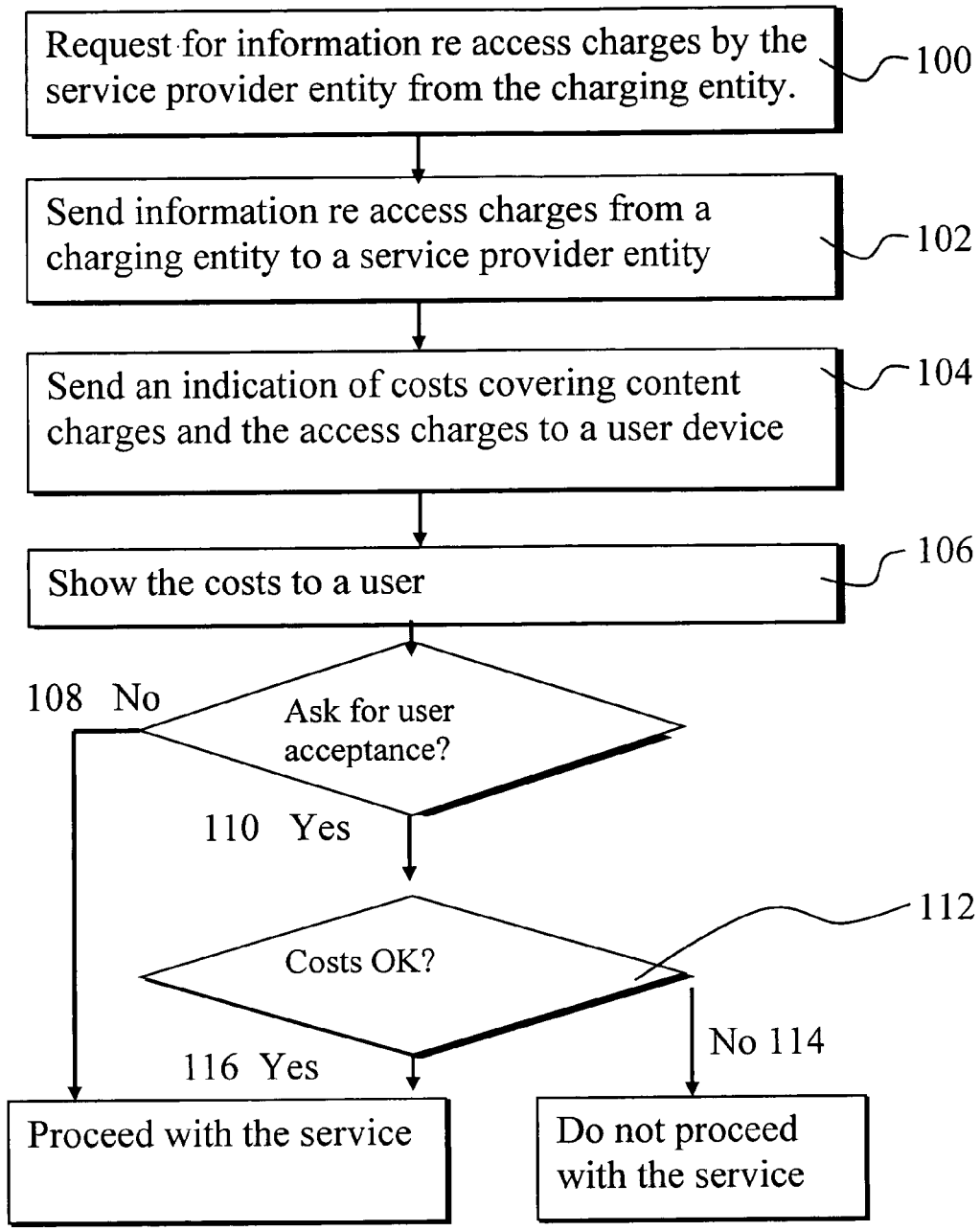
FIG. 2 shows a flowchart for operation in accordance with an embodiment of the present invention.

FIG. 2 shows a flowchart for operation in accordance with an embodiment. In the embodiment a user of a user device is provided with information relating to the cost of using a service before he/she makes a definitive decision whether to order the service. In FIG. 2 embodiment the service provider first sends a request for information about access charges to a charging entity associated with an access network of a communication system at step 100. This is not always necessary, and information about the access charges may also be provided to the service provider entity without a specific request, for example periodically. Information regarding access charges is communicated in step 102 from the charging entity to the service provider entity. Communication between the entities may occur via the interface 30 of FIG. 1.

When generating the information, the charging entity may fetch relevant information from a database. The service provider entity may then generate an appropriate indication of total cost of the service covering content charges and the access charges, and send the indication to the user device at step 104. This communication may occur via the communication network 22.

The cost may then be displayed to the user, step 106. This preferably occurs before the service is taken into use at the user device, i.e. before the user has decided if he/she wants to use the service. The cost can be presented for the end-user only for information, and the service provision is continued automatically, step 108. Alternatively, the end user may be asked to accept the cost, see step 110. In the latter case, if the cost are acceptable at step 112, the user may order the service by sending his acceptance, step 116. If the costs are not acceptable, the user does not respond at all, or sends a denial, and may not be charged, step 114.

There are various ways to support the providing of indications regarding the access charges from the content that is to be downloaded, if the service is ordered. According to a possibility the service provider 24 may request information regarding the access charges via the on-line charging interface 30. The charging web service provided by server 26 supports the relevant service interface and charging server functionality. The service interface is on the operator side of the connection, i.e. the charging interface is controlled by the operator. The TPSP can be seen as the client of the charging service. The charging interface can be used for all exchange of charging information between the service provider and the charging entity of the operator.

Figure 3:
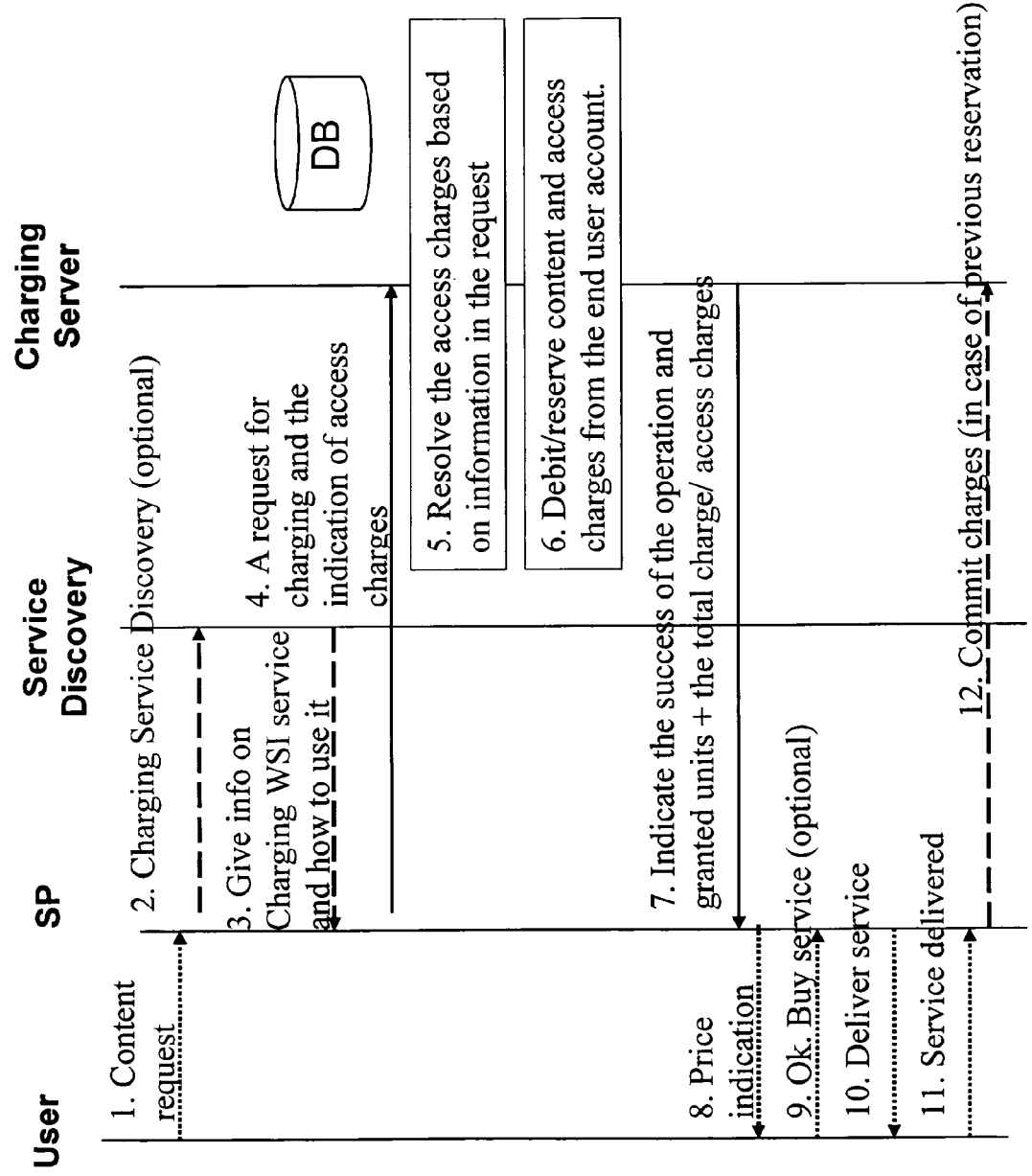
FIG. 3 is a sequence diagram in accordance with an embodiment the invention.

The signalling flow of FIG. 3 shows operation in accordance with this embodiment in more detail. In the flow chart the solid lines present functionalities that are required by this embodiment and dashed lines describe functionalities that may be needed to support the particular communication environment, but are not necessary. Dotted lines are for information purposes only.

The end-user requests for a service, for example a game or other content, from a service provider by message 1. Optional messages 2 and 3 may be signalled for discovery of a charging web service interface (WSI) service, for example by using a functionality provided by the Project Liberty Alliance. A request 4 containing information about the service and the end-user is then sent from the service provider to the operator. Request 4 may contain information regarding the end-user, the requested service, volume of the content, the access bearer and so on. This message may also include various other parameters, such as information regarding rates, credit reservations, credit deductions, credit checks, charging method and so on. The charging system can be made aware of what access bearer the terminal is using based on a service identifier or a correlation-identifier in the request that is received by the charging system. This can be, for example, a user identity or a dynamically defined service identity that is defined when the access is initiated.

The operator owned charging entity may then resolve at step 5 the costs of the access charges based on the received information and information stored in a database. At step 6 the charging entity may debit funds both for content and access charges from an end-user account, make a respective reservation or reservation on a user account. or take any other required action required for the actual charging.

A response message 7 may contain information regarding granted charging units and a specific field or parameter for indicating either the total const or at least the access charges for the service. The online charging interface mechanism can include to the response message the access charges that the service provider server can then add to the price of the content. According to an alternative the response can contain the total charges of the service, for example if the service is also rated by the operator.

The total charges or the access charge only caused by the download are then indicated to the service provider by message 7. The service provider may then indicate the price to the end-user by message 8.

In accordance with a possibility, in case the operator is also rating charge of the content, the mobile operator can indicate the costs of the service directly to the end-user through appropriate channels.

The end-user may then confirm that he/she is willing to use the service by message 9. The service is delivered by signalling 10. After completion of the service delivery the success thereof may be indicated to the TPSP by signalling 11.

In case of the first request towards the operators charging infrastructure only made a reservation of charging units, the reserved units can be committed in response to message 12.

According to another possibility the service provide is provided with a database that contains access charge rates for all its customers. This may be a more complicated to provide, because the service providers do not commonly define themselves what the access charges are. Thus even in this alternative the service provider needs to request information from the operator of the end-user. The end-user may also have different tariffs for the access charges depending the time of the day, so the service provider may need frequently update the information.

Further exemplifying embodiments will now be described with reference to FIGS. 4 to 6. In these embodiments a user device 20 is involved, at least to a degree, in generation of the total charge information. The involvement of the user device 20 may be provided in various ways. For example, the user device may be made aware of the access charges incurred for data traffic. This information may come from the access network 22. The access charge information available at the user device 20 may then be utilised either at the user device or at an appropriate entity at the network side when calculating the total charge.

Figure 4:
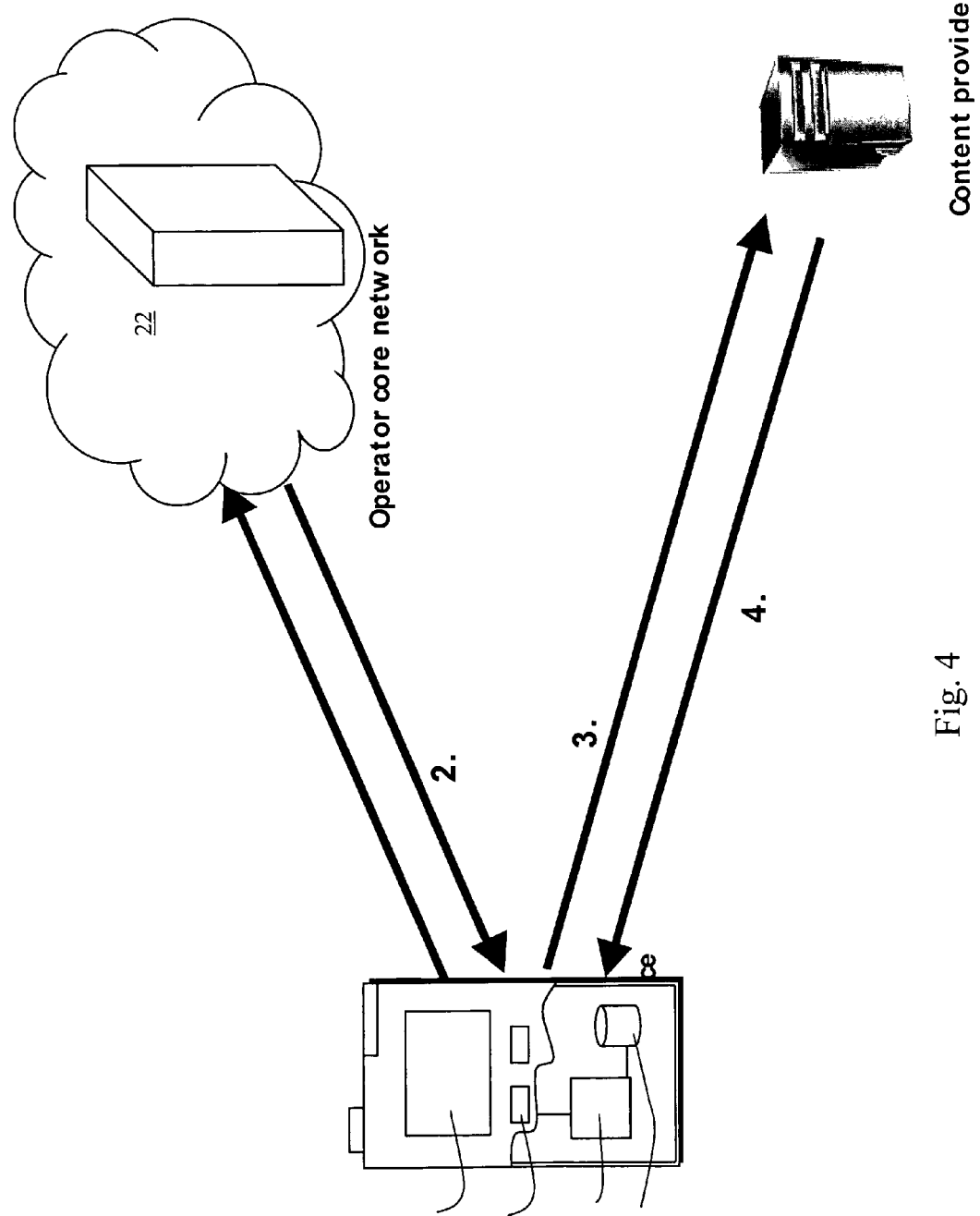
FIG. 4 shows signalling flows in accordance with an embodiment.

A possible way to provide the communication interfaces of FIG. 4 is to use an HTTP/XML (Hypertext Transport Protocol/eXtensible Markup Language)-based Web Services interface towards the operator network and a similar interface towards the content provider. It is also possible to simply use HTTP-headers for the communication.

Figure 5:
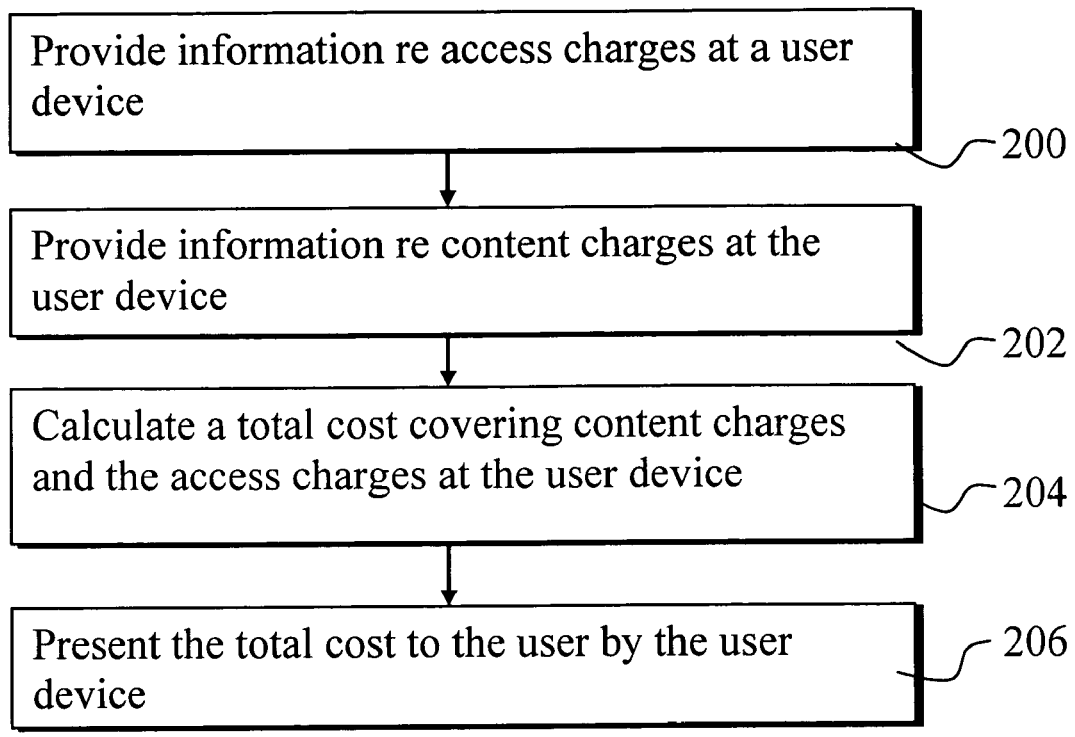
FIG. 5 shows a flowchart for operation in accordance with an embodiment.

In the embodiment of FIG. 5 the user device 20 is provided with information regarding the access charges at step 200 and information regarding the content charges at 202, where after the user device itself may calculate at 204 the total charge. This scenario enables operation wherein no action is required from the content provider, or another entity at the network side.

In accordance with the specific example, the user device may use appropriate data, for example metadata such as information contained in JAD-files of Java 2 Platform Micro Edition (JME2) to calculate the price of the transmission. JME2 is a Java application environment providing a framework for the deployment and use of Java technology. A JAD file is a Java Application Descriptor file that contains information about a Java Archive Repository (JAR) file. A JAD file contains the name, file size, and version of the actual JAR content file. This information may then be displayed or otherwise reported to the user at 206, preferably before the user accepts the download. The user device may be configured to wait until it receives an indication of acceptance of the total cost of the service, for example an activation of a predefined key or menu option. The request for the service may then be transmitted in response to said indication.

Figure 6:
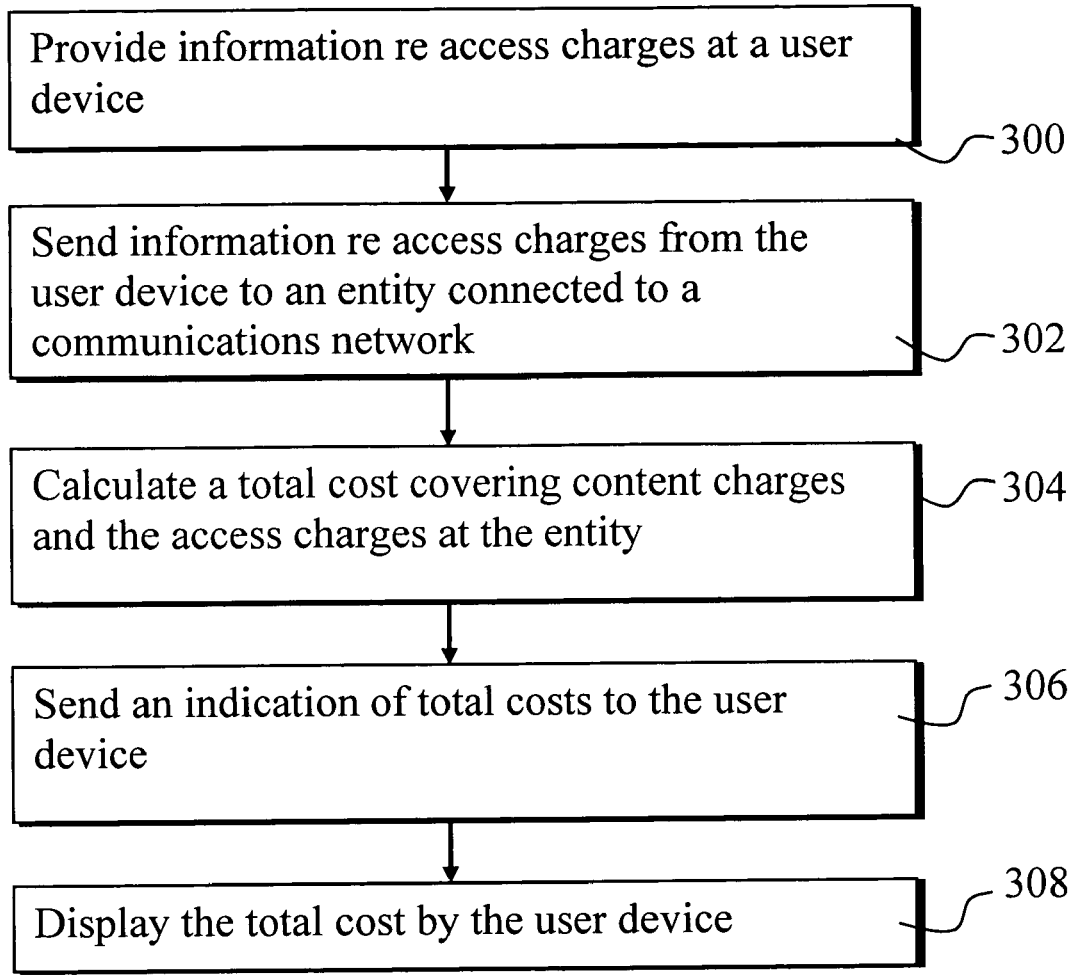
FIG. 6 shows a flowchart for operation in accordance with a further embodiment.

In an another embodiment shown in FIG. 6 a user device is provided with access charge information at step 300. The user device may then report the access charge information at 302 to the content provider or another appropriate entity at the network. The information from the user device may then be used at the network side at 304 in calculating the total charge. The full, complete purchase price may then be reported at 306 to the user device based on at least partially information originating from the user device at step 302. The total cost may then be presented to the user at 308.

In a further embodiment the content provider may be able to dynamically adjust the price of the content based on the subscriber's traffic charges. For example, to be able to offer uniform pricing for all users, those with flat-rate data subscriptions may be charged relatively more compared to those with high data traffic costs. The perceived end-user price would stay the same. Communications to the operator may be enabled for example for the purposes of traffic compensation negotiations or other arrangements.

On the operator-side, an interface may be provided for queries from user devices regarding the prices for packet data traffic. The interface may be positioned at a charging server or similar charging element of the network. On the content provider side, the server 24 may be adapted to interpret pricing information provided in various formats. The information can be provided, for example, in the form of an XML-request or can be supplied in the content request HTTP-headers and so on.

The overall high-level message flow of FIG. 4 may be as follows. The user device 20 may send at 15 a request to the operator querying the current data charging rate. The charging rate can be given, for example, per Megabyte. An appropriate network node 22, for example a charging server, then responds at 16 with the current data-charging rate. The user device may then request at 17 for a service or content from a content provider 24. The user device includes information regarding the current data charging rate in the request. The content provider may then calculate the total content price, and reply at 18 with the total charge for the content.

Steps 15 and 16 may be performed periodically, for example as once a day or a week. The results can be cached in the memory of the user device. The operator core network may also push the charging rate information to the user device periodically, and/or advice the user device to update the rate information when the rates change.

According to a further embodiment the content provider and the access network operator may interact and automatically agree on various features, for example on possible discounts to the packet data traffic rates. The content provider may, for example, sponsor the traffic charges for some user segments.

Embodiments may be made independent of the actual payment mechanism that is used to pay for the content. Some of the embodiments may allow a non-affiliated content provider to offer a service with a known total price without relationships with the network operator.

The required data processing functions may be provided by means of one or more data processors. Appropriately adapted computer program code product may be used for implementing the embodiments, when loaded to a computer, for example a processor of the communication device and/or any of the other nodes associated with the operation. The program code means may, for example, perform the generation of messages and/or information elements, interpretation and so forth. The program code product for providing the operation may be stored on and provided by means of a carrier medium such as a carrier disc, card or tape. A possibility is to download the program code product via a data network. The required data processing functionalities of the user device 20 may be embedded in, for example, a browser or an appropriate content discovery client 21 of the user device. A mechanism for providing an advice of the charges for the end user may be provided at the user device and/or at the content provider.

The herein described embodiments enable an end user to have a single price for a service including access charges and content charges. This information can be provided for a user before he/she decides to use the service. The total costs or the rate of a service can be also presented during service provision session, for example after a rate of a video streaming service changes, or a certain predefined cost has been exceeded.

It is noted that whilst embodiments of the present invention have been described in relation to communication devices such as mobile stations, embodiments of the present invention are applicable to any other suitable type of devices suitable for communication via a communications network.

It is also noted that although the above example relates a request-response model, the services may be pushed to user devices. For example, a service provider server may detect based on a database or its settings that a communication device is present in an access network, and that it may wish to use a service. In this model a specific request by the end-user may not be necessary.

It is noted that even though the exemplifying embodiments shown and described in this disclosure use the terminology of the $3^{rd}$ generation (3G) WCDMA (Wideband Code Division Multiple Access) networks, such as UMTS (Universal Mobile Telecommunications System), CDMA2000 systems and wireless local area networks, embodiments of the proposed solution can be used in any communication system wherein advantage may be obtained by means of the embodiments of the invention, fort example for providing an access system for an IPsec tunnel.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
receiving at a user device from a charging entity of an access system access information regarding access charges of the access system;
the user device communicating said access information regarding access charges of the access system to a service provider in a request for a service from the service provider; and
the user device receiving from the service provider cost information comprising a total cost of the service, the total cost being based on a charge for the service from the service provider and on access charges of the access system for accessing the service.

2. A method as claimed in claim 1, wherein the communicating occurs before the service is taken into use at the user device.

3. A method as claimed in claim 1, wherein the communicating occurs during use of the service.

4. A method as claimed in claim 1, further comprising:
the communicating prompting the service provider to send to the charging entity information identifying the service and the user device.

5. A method as claimed in claim 1, further comprising:
the communicating prompting the service provider to send to the charging entity a message containing information regarding at least any one of the user device, the service, volume of content to be communicated, and a data bearer between the user device and an access network.

6. A method as claimed in claim 1, further comprising:
sending an acceptance of the total cost from the user device.

7. A method as claimed in claim 1, in which the access information comprises access charge rate information which is received from the charging entity in the absence of a request by the user device.

8. A method as claimed in claim 7, wherein the user device periodically receives the access charge rate information from the charging entity.

9. A method as claimed in claim 7, in which the user device receives access charge rate information from the charging entity automatically after a rate change.

10. A method as claimed in claim 1, in which the access information comprises access charge rate information which is received by the user device in response to a request made by the user device.

11. A method as claimed in claim 1, wherein the service requested from the service provider is a service for content and wherein the charge for the content portion of the total cost of service is dynamically adjusted based on said information regarding access charges previously communicated to the service provider from the user device.

12. A method as claimed in claim 1, where the total cost of the service is based at least in part on information exchanged between the charging entity and the service provider via a charging web service interface between the service provider and the charging entity.

13. A method as claimed in claim 1, wherein the user device comprises a mobile device, and the access system comprises an access network of a mobile communication network.

14. A computer readable medium comprising computer code that when executed is configured to control a processor to perform:
receiving at a user device from a charging entity of an access system access information regarding access charges of the access system;
communicating, by the user device, said access information regarding access charges of the access system to a service provider in a request for a service from the service provider; and
the user device receiving from the service provider cost information comprising a total cost of the service, the total cost being based on a charge for the service from the service provider and on access charges of the access system for accessing the service.

15. The computer readable medium as claimed in claim 14, where the total cost of the service is based at least in part on information exchanged between the charging entity and the service provider via a charging web service interface between the service provider and the charging entity.

16. An apparatus, comprising:
at least one processor; and
at least one memory including computer program code, where the at least one memory and the computer program code are configured, with the at least one processor, to cause the apparatus to at least:
receive from a charging entity of an access system access information regarding access charges of the access system;
communicate said access information regarding access charges of the access system to a service provider in a request for a service from the service provider; and
receive from the service provider cost information comprising a total cost of the service, the total cost being based on a charge for the service from the service provider and on access charges from the access system for accessing the service.

17. An apparatus as claimed in claim 16, wherein said computer program code is further configured, with the at least one processor, to cause the apparatus to send an acceptance of the total cost, and receive the access information at least one of periodically, upon a change in a charging rate, and in response to a request transmitted from the user equipment.

18. The apparatus as claimed in claim 16, where the total cost of the service is based at least in part on information exchanged between the charging entity and the service provider via a charging web service interface between the service provider and the charging entity.

19. An apparatus, comprising:
at least one processor; and
at least one memory including computer program code, where the at least one memory and the computer program code are configured, with the at least one processor, to cause the apparatus to at least:
receive from a user device access information regarding access charges of an access system for communication of a service provided by a service provider entity in a request via an access system of a communications network for the service from the service provider entity; and
transmit to the user device cost information comprising a total charge for the service, the total charge being based on access charges from the access system for accessing the service and a charge for the service requested of the service provider entity.

20. An apparatus as claimed in claim 19, further comprising said computer program code is configured, with the at least one processor, to cause the apparatus to dynamically adjust the total charge for the service based at least in part on the received access charges.

21. An apparatus as claimed in claim 19, wherein the computer program code is configured, with the at least one processor, to cause the apparatus to receive from the user an indication of acceptance of the total cost charge of the service, and send a request for the service in response to said indication.

22. An apparatus as claimed in claim 19, wherein the computer program code is configured, with the at least one processor, to cause the apparatus to process information regarding access charges received from the communications network.

23. An apparatus as claimed in claim 19, wherein the computer program code is configured, with the at least one processor, to cause the apparatus to generate information regarding the access charges.

24. An apparatus as claimed in claim 23, wherein the computer program code is configured, with the at least one processor, to cause the apparatus to generate said information regarding the access charges based on metadata.

25. An apparatus as claimed in claim 19, further comprising:
the computer program code is configured, with the at least one processor, to cause the apparatus to store access charge information.

26. A method, comprising:
providing a user device with charge information regarding a service;
receiving from the user device access information regarding access charges of an access system in a request to access the service;
processing said information regarding the access charges of the access system and said information regarding the service charges;
providing, to the user device, the total cost charge of the service, the total cost being based on the charge regarding the service, and on access charges of the access system to access the service.

27. A method as claimed in claim 26, further comprising:
receiving from the user device an indication of acceptance of the total cost charge of the service; and
sending a request for the service in response to said indication.

28. A method as claimed in claim 26, further comprising:
pushing rate information from a communications network to the user device.

29. A method as claimed in claim 26, further comprising:
sending periodically rate information from a communications network to the user device.

30. A method as claimed in claim 26, further comprising:
sending rate information from a communications network to the user device after a rate change.

31. A method as claimed in claim 26, further comprising:
sending a request for rate information received from the user device to a communications network.

32. A method as claimed in claim 26, wherein the processing prompts the user device to display said information regarding the total cost charge at the user device based on metadata.

33. A computer program embodied on a non-transitory computer readable medium that when executed controls a processor to perform:
providing a user device with charge information regarding a service;
receiving in a request for the service from the user device access information regarding access charges of an access system for communication of the service; and
processing said information regarding the access charges of the access system and said charge information regarding the service to determine a total cost charge of the service; and
presenting on a user interface of the user device the total cost charge of the service enabling a user to accept or not accept the service, the total cost being based on charges for the service and on access charges of the access system for accessing the service.

\* \* \* \* \*